(12) United States Patent
Bicakci et al.

(10) Patent No.: US 6,970,515 B1
(45) Date of Patent: Nov. 29, 2005

(54) LINE DRIVER FOR ASYMMETRIC DIGITAL SUBSCRIBER LINE SYSTEM

(75) Inventors: Ara Bicakci, San Jose, CA (US); Cormac S. Conroy, Sunnyvale, CA (US)

(73) Assignee: LSI Logic Corporation, Milpitas, CA (US)

( * ) Notice: Subject to any disclaimer, the term of this patent is extended or adjusted under 35 U.S.C. 154(b) by 765 days.

(21) Appl. No.: 09/878,142

(22) Filed: Jun. 8, 2001

(51) Int. Cl.[7] ............................................. H04B 3/00
(52) U.S. Cl. ..................... 375/257; 375/219; 375/220; 375/258; 370/321; 370/470
(58) Field of Search ................ 375/257, 258, 375/297, 219, 220; 379/22.02, 345; 330/75, 330/69, 265; 370/321, 470; 327/108

(56) References Cited

U.S. PATENT DOCUMENTS

| | | | |
|---|---|---|---|
| 6,218,872 B1 * | 4/2001 | Koren ......................... | 327/108 |
| 6,359,505 B1 * | 3/2002 | Joffe ............................ | 330/69 |
| 6,411,136 B1 * | 6/2002 | Nianxiong et al. ......... | 327/108 |
| 6,580,286 B1 * | 6/2003 | Tennen ........................ | 326/30 |
| 6,788,745 B1 * | 9/2004 | Lim et al. ................... | 375/297 |
| 6,801,621 B1 * | 10/2004 | Tennen et al. .............. | 379/345 |

OTHER PUBLICATIONS

Regan, Tim, "ADSL Line Driver Design Guide, Part 2", printed from http://www/linear.com/ezone/dsl2.html, on May 30, 2001.

* cited by examiner

Primary Examiner—Shuwang Liu
(74) Attorney, Agent, or Firm—Thelen Reid & Priest, LLP

(57) ABSTRACT

A line driver couples a data transceiver to a transmission line having a load impedance Z via a transformer with a turns ratio of 1:n, the data transceiver transmitting signals in a first frequency range and receiving signals in a second frequency range different from the first frequency range. The line driver includes an input port for receiving an input signal voltage, an output port for supplying an output signal voltage to the transformer, and a differential amplifier having a low pass filter for amplifying the input signal voltage and outputting an amplified signal voltage. The line driver further includes termination resistors having a resistance $R_t$, where $$R_t = \frac{Z}{2n^2} \times k \quad (0 < k \leq 1),$$

and a positive feedback path for coupling the output signal voltage from the output port to an appropriate node of the differential amplifier so that a synthesized output impedance substantially matches the load impedance Z over the second frequency range.

15 Claims, 9 Drawing Sheets

LINE DRIVER FOR ASYMMETRIC DIGITAL SUBSCRIBER LINE SYSTEM

FIELD OF THE INVENTION

The present invention relates to digital subscriber line (DSL) technologies. More particularly, the present invention relates to a line driver for an asymmetrical digital subscriber line (ADSL) system.

BACKGROUND OF THE INVENTION

DSL and ADSL systems use a technique called discrete multitone (DMT) for transmitting data. With DMT, a frequency band up to 1.2 MHz is split up into 256 tones (also referred to as subcarriers or subchannels) each spaced 4.3125 kHz apart. In a DSL/ADSL application, the tones are allocated for use depending on the direction of communication between a central office (CO) and a remote terminal (RT) or customer premises equipment (CPE).

Communication from a CO to a RT/CPE (such as an end user's PC modem) is referred to as "downstream." The direction of communication from a RT/CPE to the CO is called "upstream." A higher and wider frequency range, for example, 176 kHz to 1.1 MHz, is allocated to the downstream communication, and a lower frequency range, for example, 10 kHz to 138 kHz, is allocated to the upstream communication.

FIG. 1 schematically illustrates a conventional ADSL transceiver system. A transmit signal (TX) is typically coming from a digital signal processing (DSP) processor 1 through a digital to analog converter (DAC) 2 to an analog front end (AFE) 3. The AFE is a circuit block that provides the interface between the ADSL transceiver and the DSP processor, and typically includes a filter. In order to comply with strict ADSL transmission mask specifications, sufficient filtering must be provided in the transmit direction. The transmit signal is then supplied with sufficient voltage and current by the line driver 5, and coupled via a transformer 7 to a transmission line 9, such as a telephone line or twisted-pair loop. The transmission line 9 has a certain line impedance Z (typically 100 Ω).

As shown in FIG. 1, back termination resistors 6 are inserted between outputs of the line driver 5 and the primary of the transformer 7 in order to properly terminate a signal received from the transmission line 9 (receive signal:RX). That is, the back-termination resistors 6 have a specific resistance $R_{BT}$ so as to match the output impedance $Z_{out}$ of the transceiver and the transmission line impedance Z. When the transformer 7 has a turns ratio of 1:n, the standard value of the back-termination resistors $R_{BT}$ is $$\frac{Z}{2n^2}$$

for a differential line driver as shown in FIG. 1.

Although the back-termination resistors are necessary to prevent undesirable reflection of the receive signal, they waste one-half of the power provided by the line driver amplifiers. Thus, in DSL systems one conventional way of reducing system power is to reduce the value of the back-termination resistors from its standard value. The reduced termination resistance reduces the drop across the resistors and thus increases the proportion of the transmit signal that reaches to the transmission line, allowing the use of a lower supply voltage for the line driver. However, simply reducing a termination resistance causes mistermination of the receive signal as well as reducing the amount of the receive signal developed across these resistors to be sensed by a receive circuit.

An approach termed "active termination" provides a positive feedback from the line driver outputs so as to boost the reduced value of termination resistor and make the effective (or synthesized) output impedance match the line impedance. FIG. 2A illustrates a conventional line driver 10 having a differential amplifier 12 with an active termination architecture. An input signal voltage $V_{in}$ is input through input resistors R1, and amplified by the differential amplifier 12 to an amplified voltage $$V_c = \frac{R_f}{R_1} \cdot \frac{(k+1)}{k+1-\frac{R_f}{R_F}} V_{in},$$

where $R_f$ is a feedback resistance of the differential amplifier 12, and $R_F$ is a resistance of the positive feedback for the active termination.

As shown in FIG. 2A, the termination resistance $R_t$ has a value reduced from its standard value by factor k, i.e., $$\frac{Z}{2n^2}k,$$

where k<1. When the line impedance has a typical value of 100 Ω, the back-termination resistance $R_t$ is $$\frac{50}{n^2}k.$$

It should be noted that for a differential structure, the total termination resistance $$\frac{Z}{n^2}k$$

is divided into a pair of termination resistors. Each amplifier output is coupled via a feedback resistance $R_F$ to the opposite amplifier input so as to make a positive feedback.

FIG. 2B shows a single-ended structure 10' corresponding to the line driver 10, for simplicity. As is understood from FIG. 2B, when the value of the feedback resistance $R_F$ is chosen to satisfy $$R_F = \frac{R_f}{1-k},$$

a synthesized impedance Z' seen looking into the circuit at the output node is $$\frac{100}{n^2},$$

matching the effective output impedance $Z_{out}$ to the line impedance Z=100.

There is a conventional technique to build a second order low pass filter around an amplifier, by adding a relatively small number of extra components. For example, a Rauch configuration is typically chosen because of its robustness against components variations. FIG. 3 illustrates a conventional line driver 14 including a differential amplifier 16 with a Rauch filter configuration. The Rauch filter/amplifier includes an operational amplifier 16, first and second input resistance $R_1$ and $R_2$, a feedback resistance $R_3$, and capacitances $½C_1$ and $C_2$, as shown in FIG. 3.

As is well understood by those of ordinary skill in the art, the transfer function of the Rauch configuration shown in FIG. 3 is given as follows, which represents the second order filter characteristic:

$$\frac{V_c}{V_{in}}(s) = \frac{\frac{R_3}{R_1} \cdot \frac{1}{R_1 R_2 C_1 C_2}}{s^2 + s \cdot \frac{G_p}{C_1} + \frac{1}{R_1 R_2 C_1 C_2}}$$

where $$G_p \equiv \frac{1}{R_1} + \frac{1}{R_2} + \frac{1}{R_3},$$

and s is the Laplace variable.

When applied to an ADSL line driver, depending on the sampling rate used in the ADSL system, the Rauch filter can be the only one present or part of a higher order filter. In ADSL applications this filter can be designed to have a cut-off frequency of 138 KHz for the CPE side transceiver, and 1.1 MHz for the CO side transceiver.

However, as shown in FIG. 3, the conventional line driver 14 with the Rauch configuration does not employ an active termination architecture. Also, the conventional impedance synthesis is used only in the line drivers configured as a pure gain stage without any filter characteristics. Because the Rauch filter is inherently frequency dependent, it is unknown to those of ordinary skill in the art how any additional components affect the required filter characteristic, or whether such additional components operate as intended.

As described above, implementing an active termination or impedance synthesis is desirable to reduce the required power of the line driver. It is also desirable to build a low pass filter around a line driver because it can eliminate extra filtering either on-chip or off-chip, so as to reduce the system cost. In addition, it is easier and less expensive to build a low pass filter around the line driver than implementing one in the AFE portion. Furthermore, providing the low-pass filter at the last stage of the transmit signal (i.e., at the line driver amplifier) is more effective in cutting off higher frequency noises. Accordingly, it would be desirable to provide both low-pass filtering and active impedance synthesis in ADSL line drivers to satisfy the transmit mask requirement.

BRIEF DESCRIPTION OF THE INVENTION

A line driver couples a data transceiver to a transmission line having a load impedance Z via a transformer with a turns ratio of 1:n, the data transceiver transmitting signals in a first frequency range and receiving signals in a second frequency range different from the first frequency range. The line driver includes an input port for receiving an input signal voltage, an output port for supplying an output signal voltage to the transformer, and a differential amplifier having a low pass filter characteristic, coupled with the input port, for amplifying the input signal voltage and outputting an amplified signal voltage. The line driver further includes termination resistors for coupling the amplified signal voltage therethrough as the output signal voltage to the output port, the termination resistors having a resistance $R_t$, where $$R_t = \frac{Z}{2n^2} \times k \ (0 < k \le 1),$$

and a positive feedback path for coupling the output signal voltage from the output port to an appropriate node of the differential amplifier so that a synthesized output impedance substantially matches the load impedance Z over the second frequency range.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a line driver for ADSL system. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
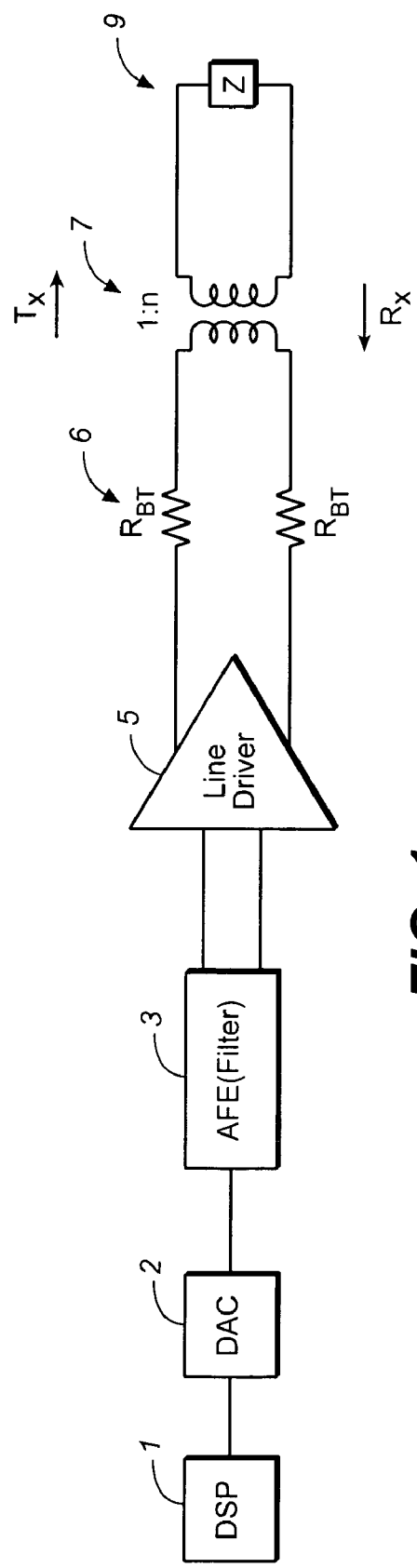
FIG. 1 is a diagram schematically illustrating a conventional ADSL transceiver system.
Figure 2A:
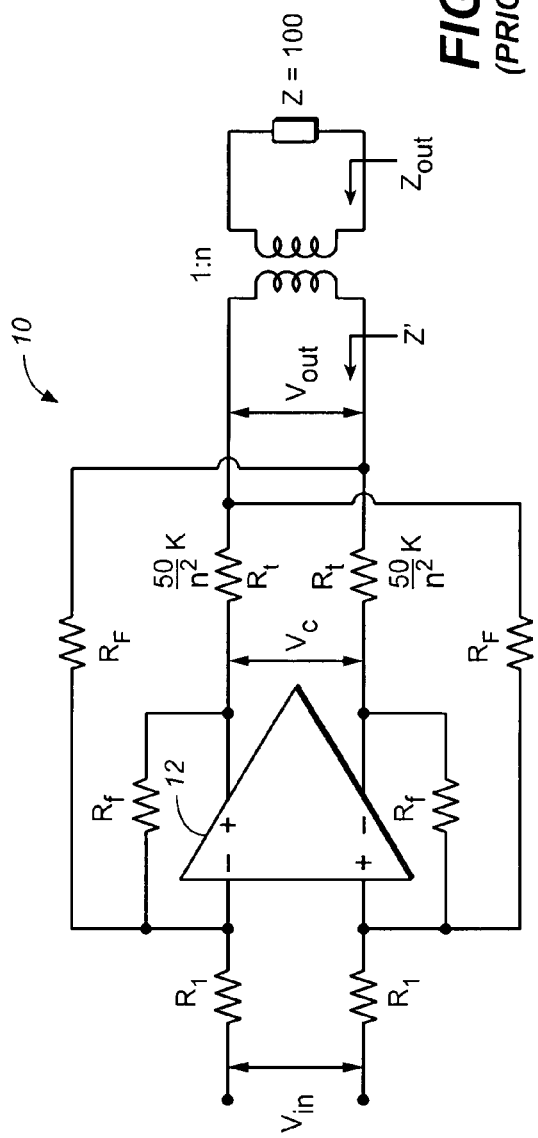
FIG. 2A is a diagram illustrating a conventional line driver having a differential amplifier with an active termination architecture.
Figure 2B:
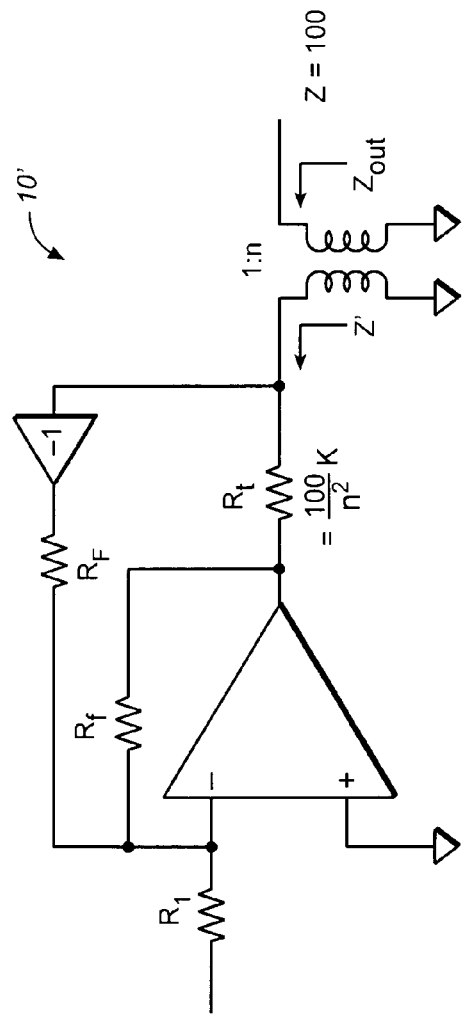
FIG. 2B is a diagram illustrating a conventional line driver having a single-ended amplifier with an active termination architecture.
Figure 3:
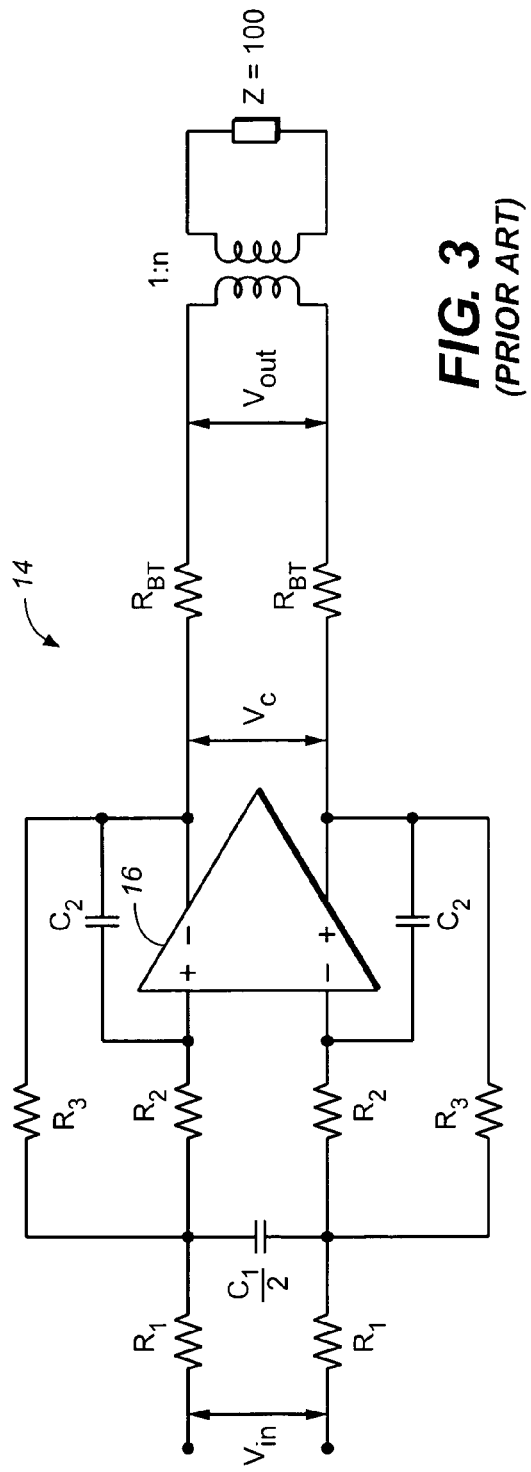
FIG. 3 is a diagram illustrating a conventional line driver including a differential amplifier with a Rauch filter configuration.
Figure 4:
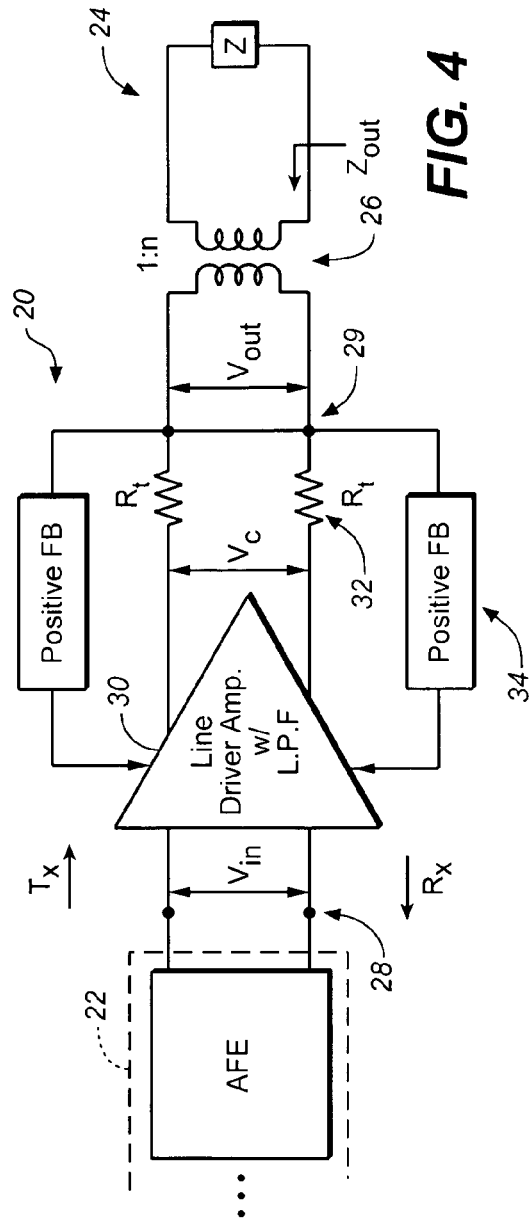
FIG. 4 is a diagram schematically illustrating a line driver in accordance with the present invention.

FIG. 4 schematically illustrates a line driver 20 in accordance with the present invention. The line driver 20 couples a data transceiver 22 (an AFE thereof is shown) to a transmission line 24 having a load impedance Z via a transformer 26 with a turns ratio of 1:n. The value of the load impedance Z is typically 100 Ω for telephone lines. The data transceiver 22 transmits signals (transmit signal: TX) in a first frequency range, and receives signals (receive signal: RX) in a second frequency range different from the first frequency range.

For example, the central office (CO) side transceiver may transmits signals in the first frequency range of 176 kHz to 1.1 MHz, which is allocated to the downstream communication to a remote terminal (RT) or customer premises equipment (CPE) side transceiver. The CO side transceiver may receive signals in the frequency range of 10 kHz to 138 kHz, which is allocated to upstream communication from a RT/CPE side transceiver to the CO side transeiver. The RT/CPE side transceiver, on the other hand, transmits signals in the frequency range of 10 kHz to 138 kHz and receives signals in the frequency range of 176 kHz to 1.1 MHz. It should be noted that these frequency ranges are examples for an illustration purpose only, and the present invention is generally applicable whenever the receive signal and the transmit signal occupy different frequency ranges.

As shown in FIG. 4, the line driver 20 includes a differential amplifier 30 having a low pass filter characteristic, an input port 28 for receiving an input signal voltage $V_{in}$ from the transceiver 22, an output port 29 for supplying an output signal voltage $V_{out}$ to the transformer 26. The amplifier 30 amplifies the input signal voltage $V_{in}$ and outputs an amplified signal voltage $V_c$. The low pass filter characteristic of the amplifier 30 may be provided implementing a Rauch configuration.

Termination resistors 32 are coupled between outputs of the amplifier 30 and the output port 29. The termination resistors 32 have a resistance $R_t$, where $R_t$, where $$R_t = \frac{Z}{2n^2} \times k \ (0 < k \leq 1).$$

That is, the value of the resistance $R_t$ is a reduced by factor k from the "standard" value $$\frac{Z}{2n^2}$$

for a complete termination. As shown in FIG. 4, the line driver 20 also includes a positive feedback path 34 for coupling the output signal voltage from the output port 29 to an appropriate node of the differential amplifier 30 so that a synthesized output impedance $Z_{out}$ substantially matches the load impedance Z over the second frequency range, i.e., the frequency range of the receive signal (RX).

When the line driver 20 is implemented in a CO side transceiver, the RX frequency range is lower than the TX frequency range, and thus the positive feedback path 34 includes a resistive coupling. When the line driver 20 is implemented in a RT/CPE side transceiver, the RX frequency range is higher than the TX frequency range, and thus the positive feedback path 34 includes a capacitive coupling.

Figure 5:
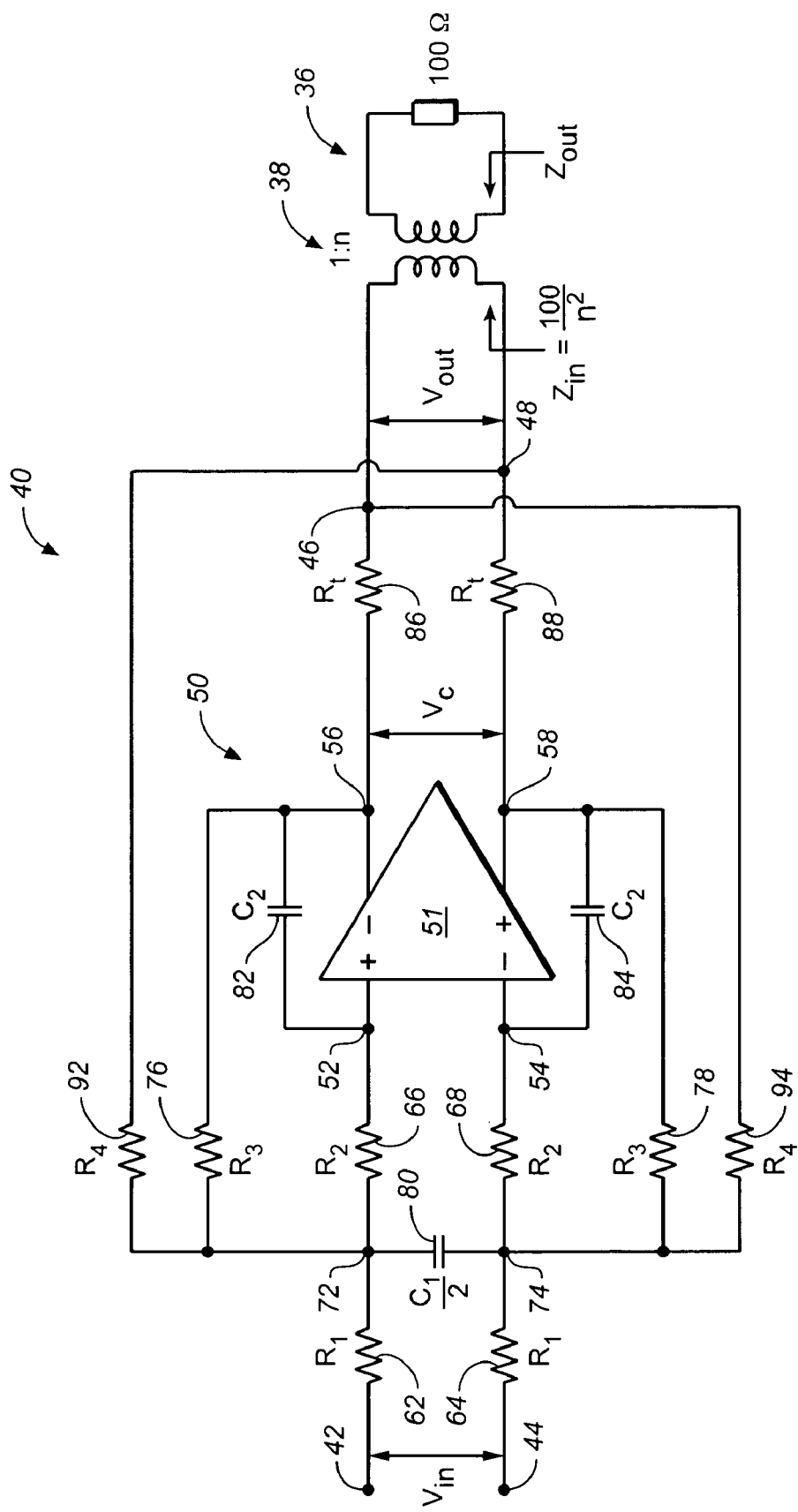
FIG. 5 is a diagram illustrating a line driver for a CO side transceiver in accordance with a specific embodiment of the present invention.

FIG. 5 illustrates a line driver 40 for a CO side transceiver in accordance with a specific embodiment of the present invention. The line driver 40 couples transmit signals from an AFE (not shown) to a transmission line 36 having a load impedance Z (typically 100 Ω) through a transformer 38 with a turns ratio of 1:n. The line driver 40 includes an amplifier 50 having a low pass filter characteristic, first and second input signal terminals 42 and 44 for receiving an input signal voltage $V_{in}$, and first and second output signal terminals 46 and 48, for supplying an output signal voltage $V_{out}$ to the transformer 38.

As shown in FIG. 5, the amplifier 50 includes an operational amplifier 51 having first and second inputs 52 and 54 and first and second outputs 56 and 58, for amplifying the input signal voltage $V_{in}$ and outputs an amplified voltage $V_c$ between the first and second outputs 56 and 58. The operational amplifier 51 has a differential structure as indicated by input and output polarities.

The amplifier 50 also includes a first input resistor 62 (having a resistance $R_1$) coupled to the first input signal terminal 42, a second input resistor 64 (having a resistance $R_1$) coupled to the second input signal terminal 44, a third input resistor 66 (having a resistance $R_2$) coupled to the first input 52, and a fourth input resistor 68 (having a resistance $R_2$) coupled to the second input 54. A first node 72 connects the first input resistor 62 and the third input resistor 66, and a second node 74 connects the second input resistor 64 and the fourth input resistor 68.

The amplifier 50 further includes a first feedback resistor 76 (having a resistance $R_3$) coupled between the first output 56 and the first node 72, a second feedback resistor 78 (having a resistance $R_3$) coupled between the second output 58 and the second node 74, a first capacitor 80 (having a capacitance $\frac{1}{2}C_1$) coupled between the first node 72 and the second node 74, a second capacitor 82 (having a capacitance $C_2$) coupled between the first output 56 and the first input 52, and a third capacitor 84 (having a capacitance $C_2$) coupled between the second output 58 and the second input 54.

As shown in FIG. 5, the lined driver 40 also includes a first termination resistor 86 coupled between the first output 56 and the first output signal terminal 46, and a second termination resistor 88 coupled between the second output 58 and the second output signal terminal 48. The termination resistors 86 and 88 have a resistance $R_t$, where $$R_t = \frac{Z}{2n^2} \times k \ (0 < k \le 1).$$

That is, the resistance $R_t$ has a value reduced by factor k from the standard value of $$\frac{Z}{2n^2}.$$

The line driver 40 further includes a positive feedback path resistively coupled around the amplifier 50. As shown in FIG. 5, a third feedback resistor 92 having a resistance $R_4$ is coupled between the second output signal terminal 48 and the first node 72, and a fourth feedback resistor 94 having the resistance $R_4$ is coupled between the first output signal terminal 46 and the second node 74. In order to match the synthesized output impedance $Z_{out}$ with the line impedance Z, the value of the resistance $R_4$ is given as $$R_4 = \frac{R_3}{(1-k)}.$$

Assuming that the resistance $R_4$ is considerably greater than $$\frac{Z}{n^2}, \frac{V_{out}}{V_c} \approx \frac{1}{k+1},$$

and from the specific configuration described above, the low pass filter characteristic of the line driver 40 is expressed as $$\frac{V_{out}}{V_{in}}(s) = \frac{\frac{R_3}{R_1} \times \frac{1}{2k} \times \frac{2k/(k+1)}{C_1 C_2 R_2 R_3}}{s^2 + s\frac{G_p}{C_1} + \frac{2k/(k+1)}{C_1 C_2 R_2 R_3}} \quad (1)$$

where s is the Laplace variable and $$G_p \equiv \frac{1}{R_1} + \frac{1}{R_2} + \frac{1}{R_3} + \frac{1}{R_4}.$$

As is well understood by those of ordinary skill in the art, Equation (1) shows a transfer function of a second order low pass filter.

The synthesized output impedance $Z_{out}$ is expressed as $$Z_{out}(s) = \frac{Z \times k}{1 - \frac{(1-k) \times \frac{1}{C_1 C_2 R_2 R_3}}{s^2 + s\frac{G_p}{C_1} + \frac{1}{C_1 C_2 R_2 R_3}}}. \quad (2)$$

Since $Z_{out}(0)=Z$, and $Z_{out}(\infty)=Z \times k$, the synthesized impedance $Z_{out}$ has a low-pass characteristic.

Note that the assumption $$R_4 >> \frac{Z}{n^2}$$

by no means indicates a loss of generality for the implementation of the present invention. In general, in order to minimize power loss, $R_4$ is chosen in the order of several kilo ohms (1 k$\Omega$=1000 $\Omega$). Since the turns ratio n is generally larger than 1 and the line impedance Z is typically 100 $\Omega$, the assumption is easily met in actual and practical implementations. Even without such considerations, the condition $$R_4 >> \frac{Z}{n^2}$$

can always be met: it is well known to those of ordinary skill in the art that for a filter implemented using capacitors, operational amplifiers, and resistors, regardless of the particular architecture used, all the resistors can be scaled up by an arbitrary constant and all the capacitors can be scaled down by the same constant while the filter frequency response remains the same. In other words one can always scale values of $R_1$, $R_2$, $R_3$, $R_4$, $\frac{1}{2}C_1$, and $C_2$ shown in FIG. 5 until $R_4$ is large enough to satisfy the condition $$R_4 >> \frac{Z}{n^2}.$$

Equation (1) can be expressed as $$\frac{V_{out}}{V_{in}}(s) = \frac{G \cdot W_n^2}{s^2 + s\frac{W_n}{Q} + W_n^2} \quad (3)$$

with $$W_n^2 = \frac{\frac{2k}{k+1}}{C_1 C_2 R_2 R_3}, \frac{W_n}{Q} = \frac{G_p}{C_1}, \text{ and } G \equiv \frac{R_3}{R_1} \cdot \frac{1}{2k}.$$

Here, $W_n$ is the natural frequency of the filter, Q is the quality factor (Q factor) of the filter, and G is the DC gain of the filter. The filter characteristic is specified by the parameters $W_n$, Q, and G.

Using Equation (3) and Z=100, Equation (2) becomes $$Z_{out}(s) = \frac{100k}{1 - \frac{((1-k)(1+k)W_n^2)/k}{s^2 + s\frac{W_n}{Q} + W_n^2 \frac{k+1}{2k}}} \quad (4)$$

$$= 100k \cdot \frac{s^2 + s\frac{W_n}{Q} + W_n^2 \frac{k+1}{2k}}{s^2 + s\frac{W_n}{Q} + W_n^2 \frac{k+1}{2}}.$$

Accordingly, by properly selecting component values $R_1$, $R_2$, $R_3$, $C_1$ and $C_2$ ($R_4$ is a function of $R_3$ and k), a desirable filter characteristic (specified by $W_n$, Q, and G) around the line driver 40 and the active termination (factor k) can be achieved simultaneously.

Figure 6A:
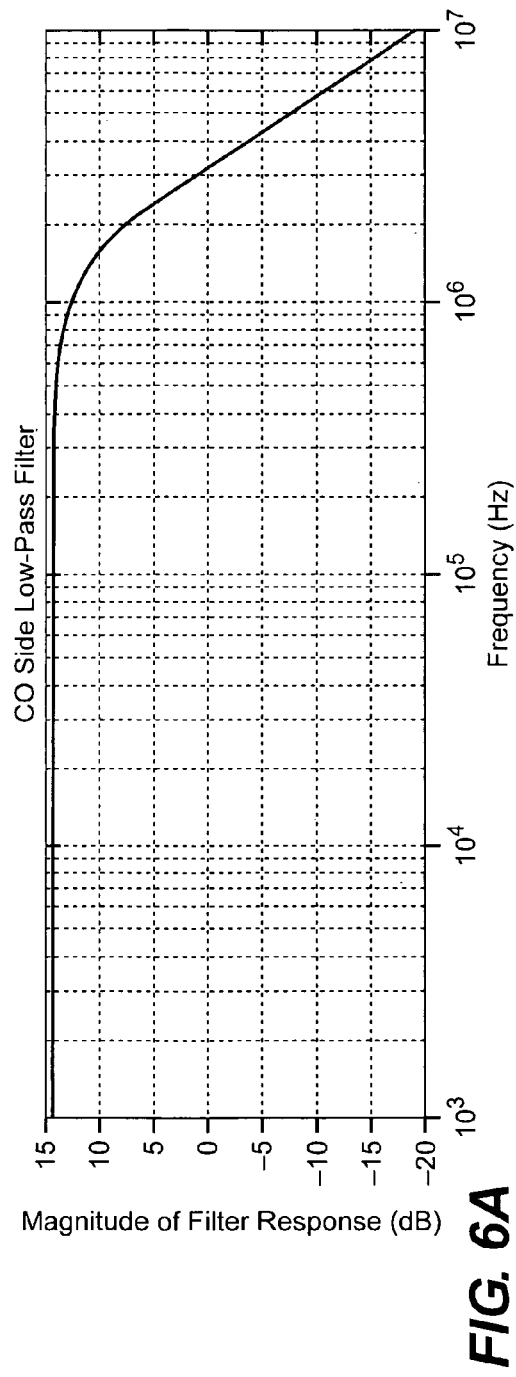
FIG. 6A is a diagram illustrating an example of low-pass filter characteristic of a CO side line driver in accordance with a specific embodiment of the present invention.
Figure 6B:
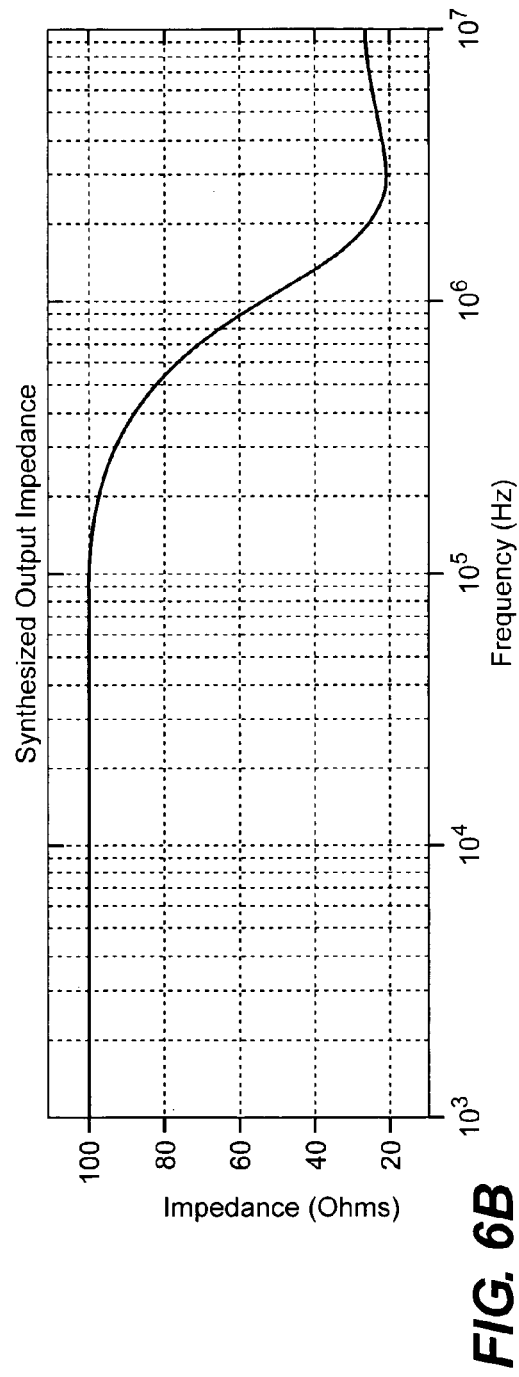
FIG. 6B is a diagram illustrating an example of the synthesized output impedance of the CO side line driver in accordance with a specific embodiment of the present invention.

FIG. 6A illustrates an example of low-pass filter characteristic of a CO side line driver for n=1.4 and k=0.275. FIG. 6B illustrates the synthesized output impedance of the same CO side line driver. The components used in this example have values of $R_1$=2000 Ω, $R_2$=374 Ω, $R_3$=5760 Ω, $R_4$=7940 Ω, $C_1$=250×10$^{-12}$ F, and $C_2$=10×10$^{-12}$ F. These component values are all standard and readily available. It should be noted that the condition $$R_4 \gg \frac{Z}{n^2}$$

is clearly met with these standard values ($R_4$=7940 is considerably greater than $$\frac{Z}{n^2} = \frac{100}{1.4 \times 1.4} \cong 51).$$

However, it should also be noted that these component values are examples for illustrative purpose only, and the present invention is not limited to specific component values.

As shown in FIGS. 6A and 6B, the filter characteristic meets the transmission mask specification (cut-off frequency about 1.1 MHz), and the synthesized output impedance substantially equals 100 Ω so as to achieve a proper termination of the receive signal. It should be noted that the frequency range of interest for a CO side termination is $10^4$ to $10^5$ Hz, or more specifically, for example, 10 kHz to 138 kHz. It should also be noted that these frequency ranges are specified for an illustration purpose only, and the present invention is generally applicable whenever the receive signal and the transmit signal occupy different frequency ranges.

Figure 7:
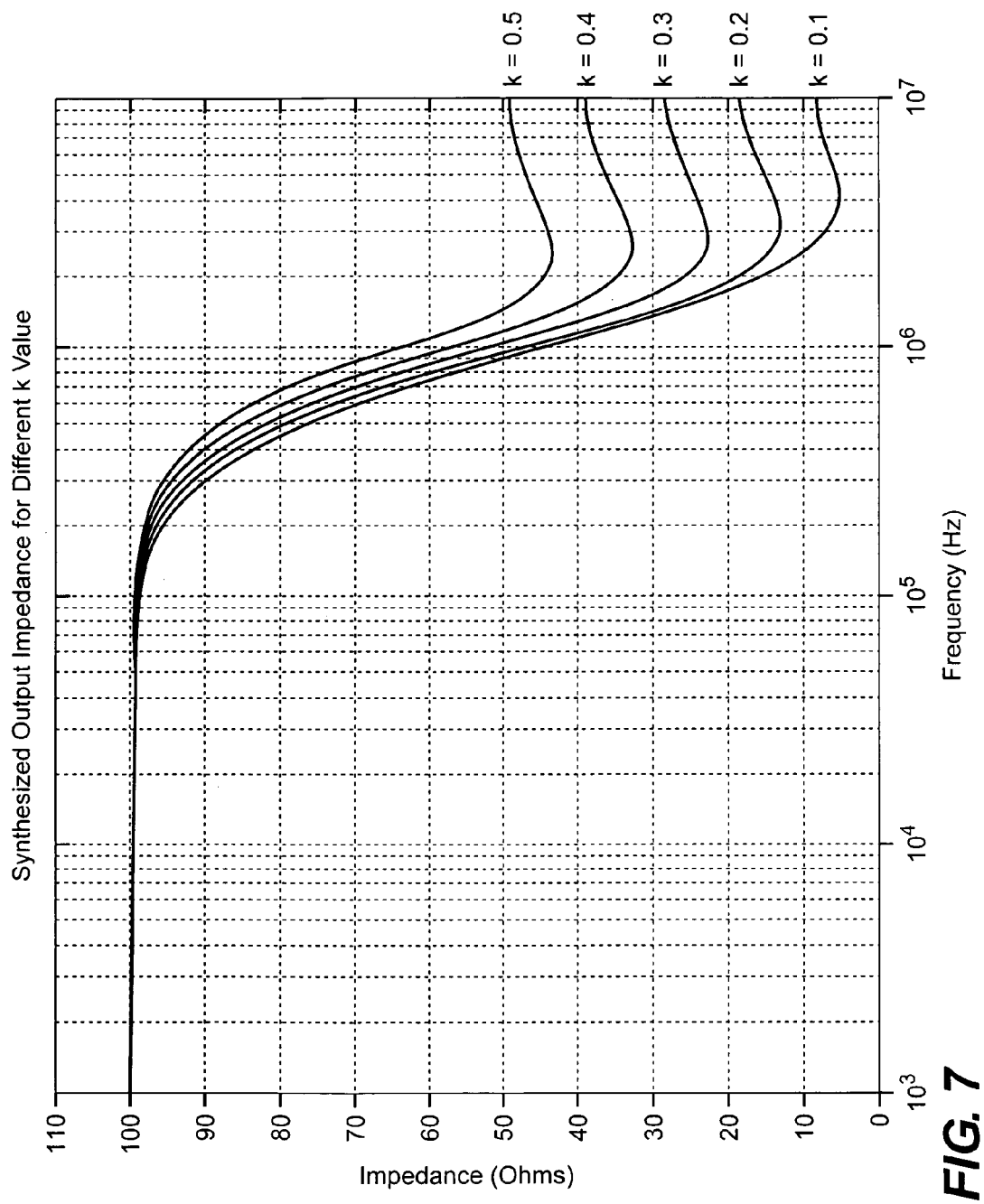
FIG. 7 is a diagram illustrating an example of synthesized output impedance of a CO side line driver for different k values in accordance with a specific embodiment of the present invention.

FIG. 7 illustrates an example of synthesized output impedance of the CO side line driver for different k values. Here, the same low-pass filter whose frequency response is depicted in FIG. 6A is implemented with different component values. As shown in FIG. 7, the synthesized output impedance is substantially 100 Ω over the frequency range of interest for various k values. It should be noted that FIGS. 6A, 6B, and 7 are shown for illustrating an example, and different filter characteristics and synthesized impedance may be achieved using different component values.

Figure 8:
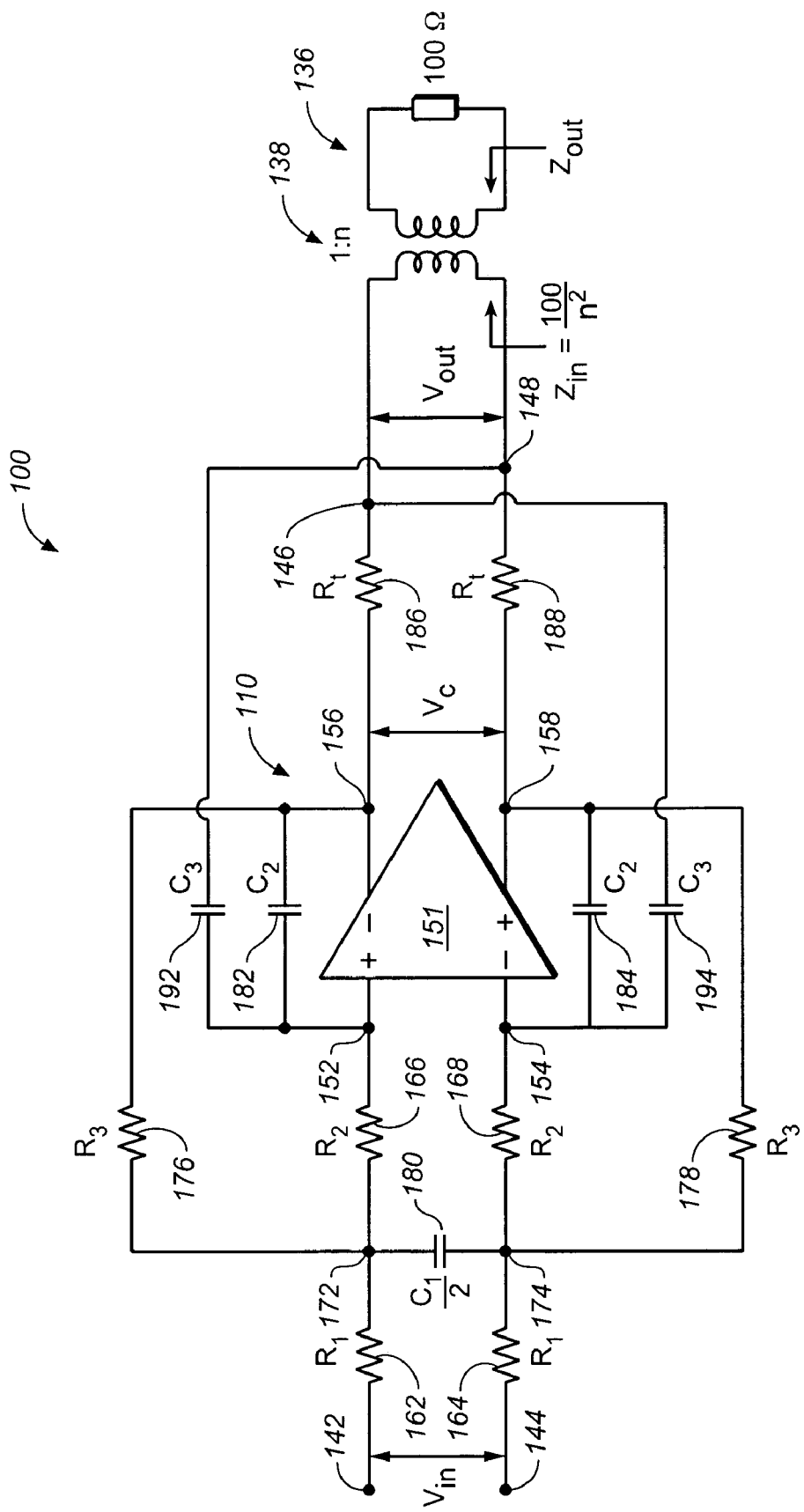
FIG. 8 is a diagram illustrating a line driver for a RT side transceiver in accordance with a specific embodiment of the present invention.

FIG. 8 illustrates a line driver 100 for a RT side transceiver in accordance with a specific embodiment of the present invention. The line driver 100 couples transmit signals from an AFE (not shown) to a transmission line 136 having a load impedance Z (typically 100 Ω) through a transformer 138 with a turns ratio of 1:n. The line driver 100 includes an amplifier 110 having a low pass filter characteristic, first and second input signal terminals 142 and 144 for receiving an input signal voltage $V_{in}$, and first and second output signal terminals 146 and 148 for supplying an output signal voltage $V_{out}$ to the transformer 138.

As shown in FIG. 8, the amplifier 110 includes an operational amplifier 151 having first and second inputs 152 and 154 and first and second outputs 156 and 158, for amplifying the input signal voltage $V_{in}$ and outputs an amplified voltage $V_c$ between the first and second outputs 156 and 158. The operational amplifier 151 has a differential structure as indicated by input and output polarities.

The amplifier 110 also includes a first input resistor 162 (having a resistance $R_1$) coupled to the first input signal terminal 142, a second input resistor 164 (having a resistance $R_1$) coupled to the second input signal terminal 144, a third input resistor 166 (having a resistance $R_2$) coupled to the first input 152, and a fourth input resistor 168 (having a resistance $R_2$) coupled to the second input 154. A first node 172 connects the first input resistor 162 and the third input resistor 166, and a second node 174 connects the second input resistor 164 and the fourth input resistor 168.

The amplifier 110 also includes a first feedback resistor 176 (having a resistance $R_3$) coupled between the first output 156 and the first node 172, a second feedback resistor 178 (having a resistance $R_3$) coupled between the second output 158 and the second node 174, a first capacitor 180 (having a capacitance ½$C_1$) coupled between the first node 172 and the second node 174, a second capacitor 182 (having a capacitance $C_2$) coupled between the first output 156 and the first input 152, and a third capacitor 184 (having a capacitance $C_2$) coupled between the second output 158 and the second input 154. It should be noted that although the same denotations $R_1$, $R_2$, $R_3$, $C_1$ and $C_2$ are used for a simplicity reason, actual values of the resistance and capacitance are different from those of the line driver 40.

As shown in FIG. 8, the lined driver 100 also includes a first termination resistor 186 coupled between the first output 156 and the first output signal terminal 146, and a second termination resistor 188 coupled between the second output 158 and the second output signal terminal 148. The termination resistors 186 and 188 have a resistance $R_t$, where $$R_t = \frac{Z}{2n^2} \times k \quad (0 < k \leq 1).$$

That is, the resistance $R_t$ has a value reduced by factor k from the standard value of $$\frac{Z}{2n^2}.$$

The line driver 100 further includes a positive feedback path capacitively coupled around the amplifier 110. As shown in FIG. 8, a first feedback capacitor 192 having a resistance $C_3$ is coupled between the second output signal terminal 148 and the first input 152, and a second feedback capacitor 194 having the capacitance $C_3$ is coupled between the first output signal terminal 146 and the second input 154. In order to match the synthesized output impedance $Z_{out}$ with the line impedance Z, the value of the capacitance $C_3$ is given as $C_3 = (1-k) \times C_2$.

When a value $$\frac{1}{2\pi f C_3}$$

is considerably greater than $$\frac{Z}{n^2}$$

for a frequency f ranging from 0 to $f_c$, where $f_c$ being a cut-off frequency of the low pass filter characteristic of the line driver 100, the transfer function is approximated as $$\frac{V_{out}}{V_c} \approx \frac{1}{1+k}.$$

Then from the specific configuration described above, the low pass filter characteristic of the line driver 100 is expressed as $$\frac{V_{out}}{V_{in}}(s) = \frac{\frac{R_3}{R_1} \times \frac{1}{(k+1)} \times \frac{(k+1)}{2kC_1C_2R_2R_3}}{s^2 + s\frac{G_p}{C_1} + \frac{(k+1)}{2kC_1C_2R_2R_3}} \quad (5)$$

where s is the Laplace variable and $$G_p \equiv \left( \frac{1}{R_1} + \frac{1}{R_2} + \frac{1}{R_3} \right).$$

As is well understood by those of ordinary skill in the art, Equation (5) shows a transfer function of a second order low pass filter.

The line driver 100 has a synthesized output impedance $Z_{out}$ expressed as $$Z_{out}(s) = \frac{Z \times k}{1 - \frac{(1-k)\left(s^2 + s \cdot \frac{G_p}{C_1}\right)}{s^2 + s\frac{G_p}{C_1} + \frac{1}{C_1C_2R_2R_3}}}. \quad (6)$$

Since $Z_{out}(0) = Z \times k$, and $Z_{out}(\infty) = Z$, the synthesized impedance $Z_{out}$ has a high pass characteristic.

Note that the assumption $$\frac{1}{2\pi f C_3} \gg \frac{Z}{n^2}$$

by no means indicates a loss of generality for the implementation of the present invention. In general, in order to minimize power loss, $C_3$ is chosen less than a couple of hundred pico farads (1 pF= $1 \times 10^{-12}$ F). Since the turns ratio n is generally larger than 1 and the line impedance Z is typically 100 Ω, the assumption is easily met for a cut-off frequency $f_c$ which is about 138 kHz for actual and practical RT/CPE applications. Even without such considerations, the condition $$\frac{1}{2\pi f C_3} \gg \frac{Z}{n^2}$$

can always be met: it is well known to those of ordinary skill in the art that for a filter implemented using capacitors, operational amplifiers, and resistors, regardless of the particular architecture used, all the capacitors can be scaled down by an arbitrary constant, and all the resistors scaled up by the same constant while the filter response remains the same. In other words one can always scale values of $R_1$, $R_2$, $R_3$, ½$C_1$, $C_2$, and $C_3$ shown in FIG. 8 until $C_3$ is small enough to satisfy the condition $$\frac{1}{2\pi f C_3} \gg \frac{Z}{n^2}$$

for a frequency range $f < f_c$.

Equation (5) can be expressed as $$\frac{V_{out}}{V_{in}}(s) = \frac{G \cdot W_n^2}{s^2 + s\frac{W_n}{Q} + W_n^2} \quad (7)$$

with $$W_n^2 = \frac{k+1}{2k \times C_1C_2R_2R_3}, \quad \frac{W_n}{Q} = \frac{G_p}{C_1}, \quad \text{and} \quad G \equiv \frac{R_3}{R_1} \cdot \frac{1}{k+1}.$$

Here, $W_n$ is the natural frequency of the filter, Q is the quality factor (Q factor) of the filter, and G is the DC gain of the filter. The filter characteristic is determined by the parameters $W_n$, Q, and G.

Using Equation (7) and Z=100, Equation (6) becomes $$Z_{out}(s) = \frac{100k}{1 - \frac{(1-k)(s^2 + sW_n/Q)}{s^2 + s\frac{W_n}{Q} + W_n^2 \frac{2k}{k+1}}} = 100 \cdot \frac{s^2 + s\frac{W_n}{Q} + W_n^2 \frac{2k}{k+1}}{s^2 + s\frac{W_n}{Q} + W_n^2 \frac{2}{k+1}}. \quad (8)$$

Accordingly, by properly selecting component values $R_1$, $R_2$, $R_3$, $C_1$ and $C_2$ ($C_3$ is a function of $C_2$ and k), a desirable filter characteristic (specified by $W_n$, Q, and G) around the line driver 100 and the active termination (factor k) can be achieved simultaneously.

Figure 9A:
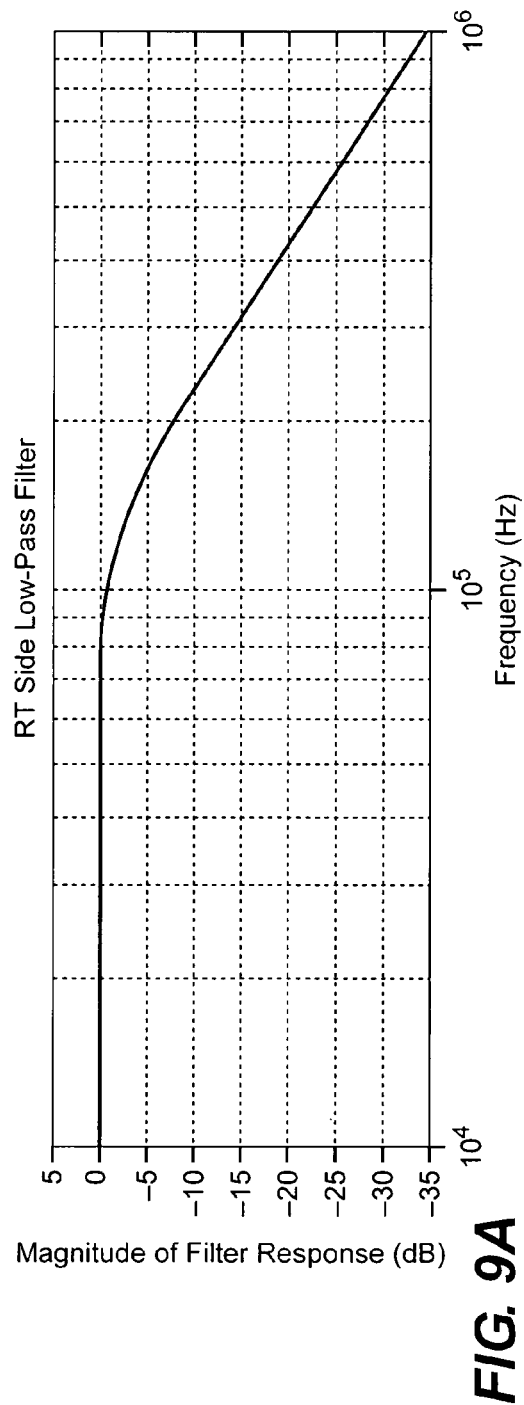
FIG. 9A is a diagram illustrating an example of low-pass filter characteristic of a RT side line driver in accordance with a specific embodiment of the present invention.
Figure 9B:
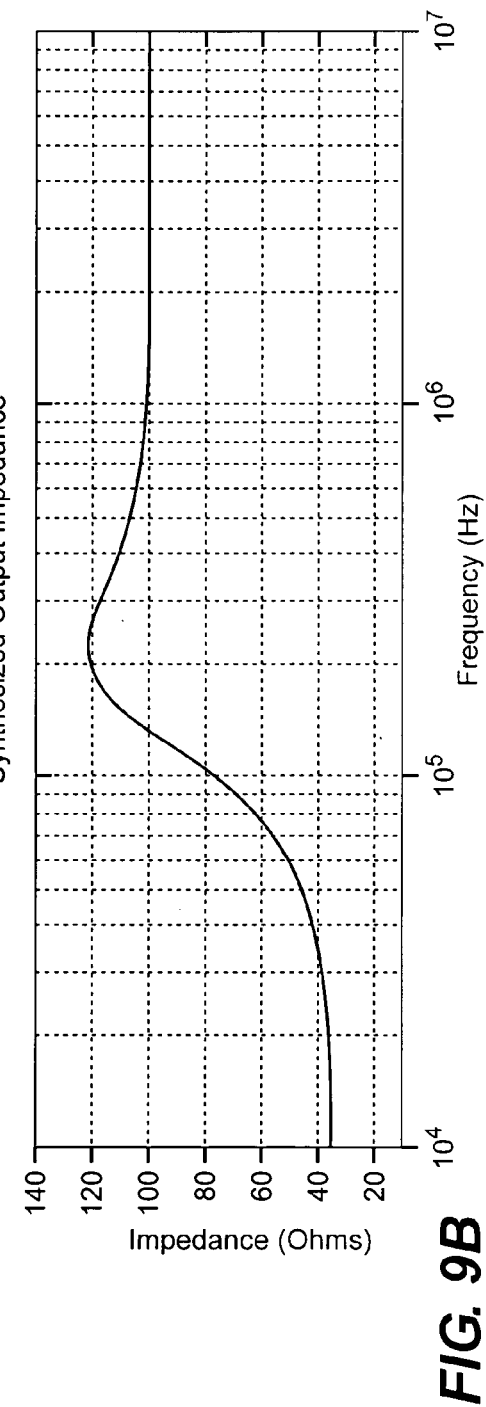
FIG. 9B is a diagram illustrating an example of the synthesized output impedance of the RT side line driver in accordance with a specific embodiment of the present invention.

FIG. 9A illustrates an example of low-pass filter characteristic of a RT side line driver for n=4 and k=0.35. FIG. 9B illustrates the synthesized output impedance of the same RT side line driver. The components used in this example have values of $R_1$=2658 Ω, $R_2$=12365 Ω, $R_3$=3678 Ω, $C_1$=590×10$^{-12}$ F, $C_2$=95×10$^{-12}$ F, and $C_3$=61×10$^{-12}$ F. These values are all standard and readily available. It should be noted that the condition $$\frac{1}{2\pi f C_3} \gg \frac{Z}{n^2}$$

for the cut-off frequency $f_c$ 138 kHz is easily met with these standard values $$\left(\frac{1}{2\pi f C_3} = 18906\right)$$

is considerably greater than $$\frac{Z}{n^2} = 6.25\right).$$

However, it should also be noted that these component values are examples for illustrative purpose only, and the present invention is not limited to specific component values.

As shown in FIGS. 9A and 9B, the filter characteristic meets the transmission mask specification (cut-off frequency about 138 kHz), and the synthesized output impedance substantially equals 100 Ω (100±20 Ω) to achieve a proper termination of the receive signal. It should be noted that the frequency range of interest for a RT side termination is 10$^5$ to 10$^6$ Hz, for example, 176 kHz to 1.1 MHz, and the synthesized impedance has an adequate value over this frequency range. It should also be noted that these frequency ranges are specified for an illustration purpose only, and the present invention is generally applicable whenever the receive signal and the transmit signal occupy different frequency ranges.

Figure 10:
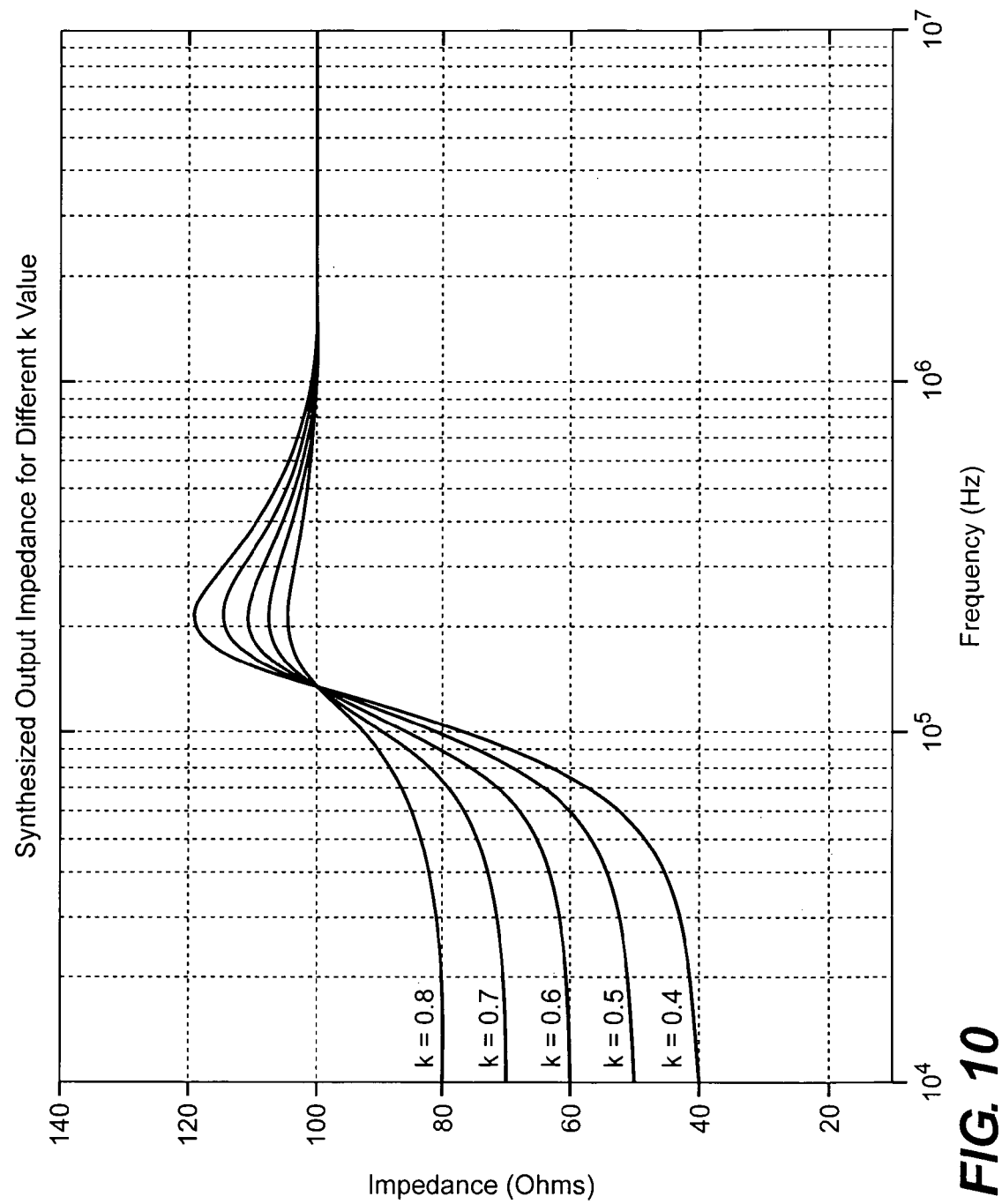
FIG. 10 is a diagram illustrating an example of synthesized output impedance of a RT side line driver for different k values in accordance with a specific embodiment of the present invention.

FIG. 10 illustrates an example of synthesized output impedance of the RT side line driver for different k values. Here, the same low-pass filter whose frequency response is depicted in FIG. 9A is implemented with different component values. As shown in FIG. 10, the synthesized output impedance is substantially 100 Ω over the frequency range of interest for various k values. It should be noted that FIGS. 9A, 9B, and 10 are shown for illustrating an example, and different filter characteristics and synthesized impedance characteristics may be achieved using different component values.

A transceiver system in accordance with the present invention includes a CO side and a RT/CPE side transceivers both having a line driver in accordance with the present invention as described above. In accordance with a specific embodiment of the present invention, the transceiver system includes the CO side transceiver having the line driver 40, as shown in FIG. 5, and the RT/CPE side transceiver having the line driver 100, as shown in FIG. 8.

In a line driver according to the present invention, a portion of the transmit signal is fed back to an appropriate node of the line driver including an amplifier having a low pass filter characteristic, for example, having the Rauch configuration. The polarity of the transmit signal which is fed back is chosen to establish a positive feedback path around the line driver and thus give the appropriate boost to the back termination resistors which are reduced in value. The transmit signal which is fed back can be coupled resistively or capacitively, depending on the frequency range of the receive signal.

When the positive feedback path is resistively coupled, the synthesized impedance takes the form of a low-pass, and when the feedback path is capacitively coupled, the synthesized impedance has a high-pass characteristic. In the both cases, the frequency response around the line driver shows the required low-pass filter characteristic. Since the received signal in ADSL CPE applications occupies a frequency band above the transmitted signal, a high-pass characteristic is acceptable in the synthesized impedance. This simply means that the active termination will provide the necessary termination for the high frequency down stream data while misterminating the line at lower frequencies where there is no useful signal. Thus a capacitive coupling is appropriate at the CPE side. On the other hand, for the CO side the received signal is at a frequency band lower than the transmitted signal, hence a low-pass characteristic in the synthesized impedance is acceptable, thus requiring resistive coupling. In this case positive feedback around the line driver will ensure proper termination for the lower frequency upstream data while misterminating the line for higher frequencies where there is no useful signal for reception.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A line driver for coupling a data transceiver to a transmission line having a load impedance Z via a transformer with a turns ratio of 1:n, said data transceiver transmitting signals in a first frequency range and receiving signals in a second frequency range different from said first frequency range, said line driver comprising:

an input port for receiving an input signal voltage;

an output port for supplying an output signal voltage to said transformer;

a differential amplifier having a low pass filter characteristic, coupled with said input port, for amplifying said input signal voltage and outputting an amplified signal voltage;

termination resistors for coupling said amplified signal voltage therethrough as the output signal voltage to said output port, said termination resistors having a resistance $R_t$, where $$R_t = \frac{Z}{2n^2} \times k \; (0 < k \leq 1);$$

and
- a positive feedback path for coupling said output signal voltage from said output port to an appropriate node of said differential amplifier so that a synthesized output impedance substantially matches the load impedance Z over the second frequency range,
- wherein said positive feedback path includes a resistive coupling if the second frequency range is lower than the first frequency range, and said positive feedback path includes a capacitive coupling if the second frequency range is higher than the first frequency range.

2. A line driver according to claim 1, wherein said differential amplifier has a Rauch configuration.

3. A line driver for coupling a data transceiver to a transmission line having a load impedance Z through a transformer with a turns ratio of 1:n, said line driver comprising:
- first and second input signal terminals for receiving an input signal voltage $V_{in}$;
- first and second output signal terminals coupled to the transformer, for supplying an output signal voltage $V_{out}$ to the transformer;
- an amplifier having a low pass filter characteristic, said amplifier including:
  - an operational amplifier having first and second inputs and first and second outputs, for outputting an amplified voltage $V_c$ between said first and second outputs;
  - a first input resistor having a resistance $R_1$, coupled to said first input signal terminal;
  - a second input resistor having a resistance $R_1$, coupled to said second input signal terminal;
  - a third input resistor having a resistance $R_2$, coupled to said first input of said operational amplifier;
  - a fourth input resistor having a resistance $R_2$, coupled to said second input of said operational amplifier;
  - a first node connecting said first input resistor and said third input resistor;
  - a second node connecting said second input resistor and said fourth input resistor;
  - a first feedback resistor having a resistance $R_3$, coupled between said first output of said operational amplifier and said first node;
  - a second feedback resistor having a resistance $R_3$, coupled between said second output of said operational amplifier and said second node;
  - a first capacitor having a capacitance $\frac{1}{2}C_1$, coupled between said first node and said second node;
  - a second capacitor having a capacitance $C_2$, coupled between said first output and said first input of said operational amplifier; and
  - a third capacitor having a capacitance $C_2$, coupled between said second output and said second input of said operational amplifier;
- a first termination resistor having a resistance $R_t$, coupled between said first output of said operational amplifier and said first output signal terminal;
- a second termination resistor having a resistance $R_t$, coupled between said second output of said operational amplifier and said second output signal terminal;
- a third feedback resistor having a resistance $R_4$, coupled between said second output signal terminal and said first node; and
- a fourth feedback resistor having a resistance $R_4$, coupled between said first output signal terminal and said second node, wherein $$R_t = \frac{Z}{2n^2} \times k, \text{ where } 0 < k \leq 1, \text{ and } R_4 = \frac{R_3}{(1-k)}.$$

4. A line driver according to claim 3, wherein the low pass filter characteristic is expressed as $$\frac{V_{out}}{V_{in}}(s) = \frac{\frac{R_3}{R_1} \times \frac{1}{2k} \times \frac{2k/(k+1)}{C_1 C_2 R_2 R_3}}{s^2 + s\frac{G_p}{C_1} + \frac{2k/(k+1)}{C_1 C_2 R_2 R_3}},$$

where s is the Laplace variable and $$G_p \equiv \frac{1}{R_1} + \frac{1}{R_2} + \frac{1}{R_3} + \frac{1}{R_4}.$$

5. A line driver according to claim 4, wherein $R_4$ is considerably greater than $$\frac{Z}{n^2}, \frac{V_{out}}{V_c} \approx \frac{1}{1+k},$$

and said line driver has a synthesized output impedance $Z_{out}$ expressed as $$Z_{out}(s) = \frac{Z \times k}{1 - \frac{(1-k) \times \frac{1}{C_1 C_2 R_2 R_3}}{s^2 + s\frac{G_p}{C_1} + \frac{1}{C_1 C_2 R_2 R_3}}}.$$

6. A line driver for coupling a data transceiver to a transmission line having a load impedance Z through a transformer with a turns ratio of 1:n, said line driver comprising:
- first and second input signal terminals for receiving an input signal voltage $V_{in}$;
- first and second output signal terminals coupled to the transformer, for supplying an output signal voltage $V_{out}$ to the transformer;
- an amplifier having a low pass filter characteristic, said amplifier including:
  - an operational amplifier having first and second inputs and first and second outputs, for outputting an amplified voltage $V_c$ between said first and second outputs;
  - a first input resistor having a resistance $R_1$, coupled to said first input signal terminal;
  - a second input resistor having a resistance $R_1$, coupled to said second input signal terminal;

a third input resistor having a resistance $R_2$, coupled to said first input of said operational amplifier;

a fourth input resistor having a resistance $R_2$, coupled to said second input of said operational amplifier;

a first node connecting said first input resistor and said third input resistor;

a second node connecting said second input resistor and said fourth input resistor;

a first feedback resistor having a resistance $R_3$, coupled between said first output of said operational amplifier and said first node;

a second feedback resistor having a resistance $R_3$, coupled between said second output of said operational amplifier and said second node;

a first capacitor having a capacitance $½C_1$, coupled between said first node and said second node;

a second capacitor having a capacitance $C_2$, coupled between said first output and said first input of said operational amplifier; and a third capacitor having a capacitance $C_2$, coupled between said second output and said second input of said operational amplifier;

a first termination resistor having a resistance $R_t$, coupled between said first output of said operational amplifier and said first output signal terminal;

a second termination resistor having a resistance $R_t$, coupled between said second output of said operational amplifier and said second output signal terminal;

a first feedback capacitor having a capacitance $C_3$, coupled between said second output signal terminal and said first input of said operational amplifier; and a second feedback capacitor having a capacitance $C_3$, coupled between said first output signal terminal and said second input of said operational amplifier.

7. A line driver according to claim 6, wherein $$R_t = \frac{Z}{2n^2} \times k,$$

where $0 < k \leq 1$,
$C_3 = (1-k) \times C_2$,
and the low pass filter characteristic is expressed as $$\frac{V_{out}}{V_{in}}(s) = \frac{\frac{R_3}{R_1} \times \frac{1}{(k+1)} \times \frac{(k+1)}{2kC_1C_2R_2R_3}}{s^2 + s\frac{G_p}{C_1} + \frac{(k+1)}{2kC_1C_2R_2R_3}},$$

where s is the Laplace variable and $$G_p \equiv \left(\frac{1}{R_1} + \frac{1}{R_2} + \frac{1}{R_3}\right).$$

8. A line driver according to claim 7, wherein a value $$\frac{1}{2\pi f C_3}$$

is considerably greater than $$\frac{Z}{n^2}$$

for a frequency f ranging from 0 to $f_c$, where $f_c$ being a cut-off frequency of the low pass filter characteristic of said line driver, $$\frac{V_{out}}{V_c} \approx \frac{1}{1+k},$$

and said line driver has a synthesized output impedance $Z_{out}$ expressed as $$Z_{out}(s) = \frac{Z \times k}{1 - \frac{(1-k)\left(s^2 + s \cdot \frac{G_p}{C_1}\right)}{s^2 + s\frac{G_p}{C_1} + \frac{1}{C_1C_2R_2R_3}}}.$$

9. A transceiver system for transmitting and receiving signals via a transmission line having a load impedance Z, said system comprising:

a first transceiver coupled to said transmission line, for transmitting signals in a first frequency range and for receiving signals in a second frequency range, said first transceiver including a first transformer having a turns ratio of 1:n, and a first line driver for supplying an output signal voltage to the first transformer, said first line driver comprising:

a first amplifier having a low pass filter characteristic, for outputting a first amplified signal;

first termination resistors for coupling said first amplified signal therethrough to an output port of said first line driver, said first termination resistors having a resistance $R_t$, where $$R_t = \frac{Z}{2n^2} \times k \ (0 < k \leq 1);$$

and a positive feedback path for resistively coupling the output signal voltage from the output port of the first line driver to an appropriate node of said first amplifier so that a synthesized output impedance substantially matches the load impedance Z over the second frequency range; and a second transceiver coupled to said transmission line, for transmitting signals in the second frequency range and for receiving signals in the first frequency range, said second transceiver including a second transformer having a turns ratio of 1:n, and a second line driver for supplying an output signal voltage to the second transformer, said second line driver comprising:

a second amplifier having a low pass filter characteristic, for outputting a second amplified signal;

second termination resistors for coupling said second amplified signal therethrough to an output port of said second line driver, said second termination resistors having a resistance $R_t$, where $$R_t = \frac{Z}{2n^2} \times k \; (0 < k \leq 1);$$

and a positive feedback path for capacitively coupling the output signal voltage to an appropriate node of said second amplifier so that a synthesized output impedance substantially matches the load impedance Z over the first frequency range.

10. A transceiver system for transmitting and receiving signals via a transmission line having a load impedance Z, said system comprising:

a first transceiver coupled to said transmission line, for transmitting signals in a first frequency range and for receiving signals in a second frequency range, said first transceiver including a first transformer having a turns ratio of 1:n, and a first line driver for supplying an output signal voltage to the first transformer, said first line driver comprising:

first and second input signal terminals for receiving an input signal voltage $V_{in}$;

first and second output signal terminals coupled to the first transformer, for supplying an output signal voltage $V_{out}$ to the first transformer;

a first amplifier having a low pass filter characteristic, said first amplifier including:

a first operational amplifier having first and second inputs and first and second outputs, for outputting an amplified voltage $V_c$ between said first and second outputs;

a first input resistor having a resistance $R_1$, coupled to said first input signal terminal;

a second input resistor having a resistance $R_1$, coupled to said second input signal terminal;

a third input resistor having a resistance $R_2$, coupled to said first input of said first operational amplifier;

a fourth input resistor having a resistance $R_2$, coupled to said second input of said first operational amplifier;

a first node connecting said first input resistor and said third input resistor;

a second node connecting said second input resistor and said fourth input resistor;

a first feedback resistor having a resistance $R_3$, coupled between said first output of said first operational amplifier and said first node;

a second feedback resistor having a resistance $R_3$, coupled between said second output of said first operational amplifier and said second node;

a first capacitor having a capacitance $\frac{1}{2}C_1$, coupled between said first node and said second node;

a second capacitor having a capacitance $C_2$, coupled between said first output and said first input of said first operational amplifier; and a third capacitor having a capacitance $C_2$, coupled between said second output and said second input of said first operational amplifier;

a first termination resistor having a resistance $R_t$, coupled between said first output of said first operational amplifier and said first output signal terminal;

a second termination resistor having a resistance $R_t$, coupled between said second output of said first operational amplifier and said second output signal terminal;

a third feedback resistor having a resistance $R_4$, coupled between said second output signal terminal and said first node; and a fourth feedback resistor having a resistance $R_4$, coupled between said first output signal terminal and said second node; and a second transceiver coupled to said transmission line, for transmitting signals in the second frequency range and for receiving signals in the first frequency range, said second transceiver including a second transformer having a turns ratio of 1:n, and a second line driver for supplying an output signal voltage to the second transformer, said second line driver comprising:

third and fourth input signal terminals for receiving an input signal voltage $V_{in}'$;

third and fourth output signal terminals coupled to the second transformer, for supplying an output signal voltage $V_{out}'$ to the second transformer;

a second amplifier having a low pass filter characteristic, said second amplifier including:

a second operational amplifier having first and second inputs and first and second outputs, for outputting an amplified voltage $V_c'$ between said first and second outputs thereof;

a first input resistor having a resistance $R_1'$, coupled to said third input signal terminal;

a second input resistor having a resistance $R_1'$, coupled to said fourth input signal terminal;

a third input resistor having a resistance $R_2'$, coupled to said first input of said second operational amplifier;

a fourth input resistor having a resistance $R_2'$, coupled to said second input of said second operational amplifier;

a third node connecting said first input resistor and said third input resistor of said second amplifier;

a fourth node connecting said second input resistor and said fourth input resistor of said second amplifier;

a first feedback resistor having a resistance $R_3'$, coupled between said first output of said second operational amplifier and said third node;

a second feedback resistor having a resistance $R_3'$, coupled between said second output of said second operational amplifier and said fourth node;

a first capacitor having a capacitance $\frac{1}{2}C_1'$, coupled between said third node and said fourth node;

a second capacitor having a capacitance $C_2'$, coupled between said first output and said first input of said second operational amplifier; and a third capacitor having a capacitance $C_2'$, coupled between said second output and said second input of said second operational amplifier;

a first termination resistor having a resistance $R_t'$, coupled between said first output of said second operational amplifier and said third output signal terminal;

a second termination resistor having a resistance $R_t'$, coupled between said second output of said second operational amplifier and said fourth output signal terminal;

a first feedback capacitor having a capacitance $C_3'$, coupled between said fourth output signal terminal and said first input of said second operational amplifier; and a second feedback capacitor having a capacitance $C_3'$, coupled between said third output signal terminal and said second input of said second operational amplifier.

11. A method for providing active impedance synthesis to a line driver having a low pass filter characteristic, said line driver coupling a data transceiver to a transmission line having a load impedance Z via a transformer with a turns ratio of 1:n, said method comprising:

providing a conventional line driver for supplying an output signal voltage to the transformer, said conventional line driver including a differential amplifier having a low pass filter characteristic;

providing termination resistors having a resistance $R_t$, where $$R_t = \frac{Z}{2n^2} \times k \ (0 < k \le 1);$$

and providing a positive feedback path around said line driver, by coupling the output signal voltage to an appropriate node of said line driver so that a synthesized output impedance substantially matches the load impedance Z for receive signal frequencies of the data transceiver, wherein said receive signal frequencies are lower than transmit signal frequencies, said positive feedback path is provided by resistive coupling having a resistance $R_f$, and the resistance $R_f$ is considerably greater than $Z/2n^2$.

12. A method according to claim 11, wherein said receive signal frequencies are within a range of about $10^4$ to about $10^5$ Hz.

13. A method for providing active impedance synthesis to a line driver having a low pass filter characteristic, said line driver coupling a data transceiver to a transmission line having a load impedance Z via a transformer with a turns ratio of 1:n, said method comprising:

providing a conventional line driver for supplying an output signal voltage to the transformer, said conventional line driver including a differential amplifier having a low pass filter characteristic;

providing termination resistors having a resistance $R_t$, where $$R_t = \frac{Z}{2n^2} \times k \ (0 < k \le 1);$$

and providing a positive feedback path around said line driver, by coupling the output signal voltage to an appropriate node of said line driver so that a synthesized output impedance substantially matches the load impedance Z for receive signal frequencies of the data transceiver, wherein said receive signal frequencies are higher than transmit signal frequencies, and said positive feedback path is provided by capacitive coupling having a capacitance $C_f$.

14. A method according to claim 13, wherein a value $$\frac{1}{2\pi f C_3}$$

is considerably greater than $$\frac{Z}{n^2}$$

for a frequency f ranging from 0 to $f_c$, wherein $f_c$ being a cut-off frequency of the low pass filter characteristic of said line driver.

15. A method according to claim 13, wherein said receive signal frequencies are within a range of about $10^5$ to about $10^6$ Hz.

* * * * *